(12) United States Patent
Hegedus

(10) Patent No.: US 12,516,013 B2
(45) Date of Patent: Jan. 6, 2026

(54) CRYSTALLINE FORMS OF SODIUM SALT OF BEMPEDOIC ACID

(71) Applicant: SYNTHON B.V., Nijmegen (NL)

(72) Inventor: Michal Hegedus, Blansko (CZ)

(73) Assignee: Synthon B.V., Nijmegen (NL)

( * ) Notice: Subject to any disclaimer, the term of this patent is extended or adjusted under 35 U.S.C. 154(b) by 758 days.

(21) Appl. No.: 17/781,915

(22) PCT Filed: Dec. 4, 2020

(86) PCT No.: PCT/EP2020/084664
§ 371 (c)(1),
(2) Date: Jun. 2, 2022

(87) PCT Pub. No.: WO2021/110929
PCT Pub. Date: Jun. 10, 2021

(65) Prior Publication Data
US 2023/0036336 A1 Feb. 2, 2023

(30) Foreign Application Priority Data
Dec. 6, 2019 (EP) .................................... 19214073

(51) Int. Cl.
*C07C 59/245* (2006.01)

(52) U.S. Cl.
CPC ........ *C07C 59/245* (2013.01); *C07B 2200/13* (2013.01)

(58) Field of Classification Search
USPC ......................................................... 562/582
See application file for complete search history.

(56) References Cited

FOREIGN PATENT DOCUMENTS

| WO | WO2004067489 | 8/2004 |
|---|---|---|
| WO | WO2018218147 | 11/2018 |
| WO | WO2020141419 | 7/2020 |
| WO | WO2020257573 | 12/2020 |

OTHER PUBLICATIONS

Berge et al., J. Pharm. Sci. 1977, vol. 66 1-18.*
Rodríguez-Spong et al. Adv. Drug Delivery Rev. 56 (2004) 241-274.*

* cited by examiner

*Primary Examiner* — Ana Z Muresan
(74) *Attorney, Agent, or Firm* — Buscher Patent PLLC

(57) ABSTRACT

The presented invention relates to crystalline Forms (I) or (II) or (III) or (IV) of sodium salt of Bempedoic acid, processes for preparation thereof and a composition comprising it.

11 Claims, 6 Drawing Sheets

CRYSTALLINE FORMS OF SODIUM SALT OF BEMPEDOIC ACID

The invention relates to sodium salt of Bempedoic acid, a solid form thereof, crystalline forms thereof and processes for preparation thereof.

BACKGROUND OF THE PRESENT INVENTION

This invention relates to sodium salt of Bempedoic acid, compound of formula (1), i.e. compound of formula (2), a solid form thereof, crystalline forms thereof and processes for preparation thereof,

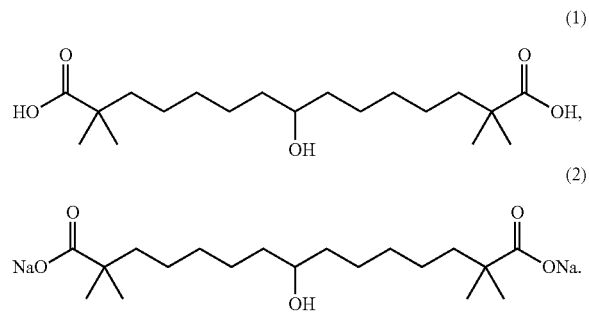

Bempedoic acid, compound of formula (1), 8-Hydroxy-2,2,14,14-tetramethyl-pentadecanedioic acid, is a dual-acting AMP-activated protein kinase (AMPK) activator and ATP citrate lyase (ACL) inhibitor. Bempedoic acid is under regulatory review for the oral treatment of hypercholesterolemia.

Bempedoic acid was disclosed in WO 2004067489 application. The process for the preparation disclosed in the application provides Bempedoic acid as a very viscous oil. A solid form of Bempedoic acid is disclosed in WO2018218147 application as a sticky solid.

There is no information in the prior art about salts of Bempedoic acid. In comparison with a base form, the salts might have improved properties such as solubility or bioavailability that is advantageous in preparation of final formulations. Because of good crystallinity the salts can be also used for purification of Bempedoic acid.

It is therefore advantageous to develop a crystalline form of a salt of Bempedoic acid that is not sticky and shows good flow properties and crystallinity.

BRIEF DESCRIPTION OF THE INVENTION

The presented invention relates to a sodium salt of Bempedoic acid, a solid form thereof, crystalline forms thereof and processes for preparation thereof.

The presented invention further relates to a pharmaceutical composition comprising the crystalline sodium salt crystalline of Bempedoic acid.

Crystalline form of sodium salt of Bempedoic acid of the presented invention show improved solubility and crystallinity.

DETAILED DESCRIPTION OF THE INVENTION

The presented invention relates to a sodium salt of Bempedoic acid, a solid form thereof, crystalline forms thereof and processes for preparation thereof. The presented invention further relates to a formulation comprising the solid forms of sodium salt of Bempedoic acid.

The invention relates to the crystalline form, Form I can be characterized by XRPD pattern having 2θ values 6.1°, 14.2° and 16.6° degrees 2 theta (±0.2 degrees 2 theta). The solid Form I can be also characterized by XRPD pattern having 2θ values 6.1°, 13.4°, 14.2°, 15.4° and 16.6° degrees 2 theta (±0.2 degrees 2 theta). The solid form can be further characterized by XRPD pattern described in the following table:

| Angle 2θ | Intensity % | Angle 2θ | Intensity % | Angle 2θ | Intensity % | Angle 2θ | Intensity % |
| --- | --- | --- | --- | --- | --- | --- | --- |
| 6.1 | 100.0 | 18.1 | 45.6 | 22.4 | 13.3 | 30.2 | 5.1 |
| 8.2 | 3.2 | 18.4 | 19.6 | 22.7 | 5.0 | 30.7 | 7.5 |
| 10.9 | 9.8 | 18.8 | 23.4 | 23.9 | 7.1 | 31.8 | 7.1 |
| 12.2 | 2.8 | 19.1 | 43.4 | 24.3 | 10.9 | 31.5 | 4.8 |
| 13.4 | 10.3 | 19.4 | 4.3 | 24.6 | 6.8 | 31.7 | 6.7 |
| 14.2 | 29.8 | 20.2 | 5.1 | 25.0 | 4.3 | 32.2 | 3.2 |
| 14.8 | 4.7 | 20.6 | 19.0 | 27.3 | 5.0 | 32.4 | 3.7 |
| 15.4 | 30.8 | 21.4 | 12.3 | 27.6 | 3.3 | 32.8 | 3.0 |
| 16.6 | 35.7 | 21.8 | 13.9 | 28.3 | 8.3 | 33.9 | 2.5 |
| 17.6 | 4.1 | 22.4 | 5.8 | 29.0 | 4.1 | 28.3 | 8.3 |
|  |  |  |  | 29.5 | 7.8 |  |  |
|  |  |  |  | 29.9 | 3.7 |  |  |

Figure 1:
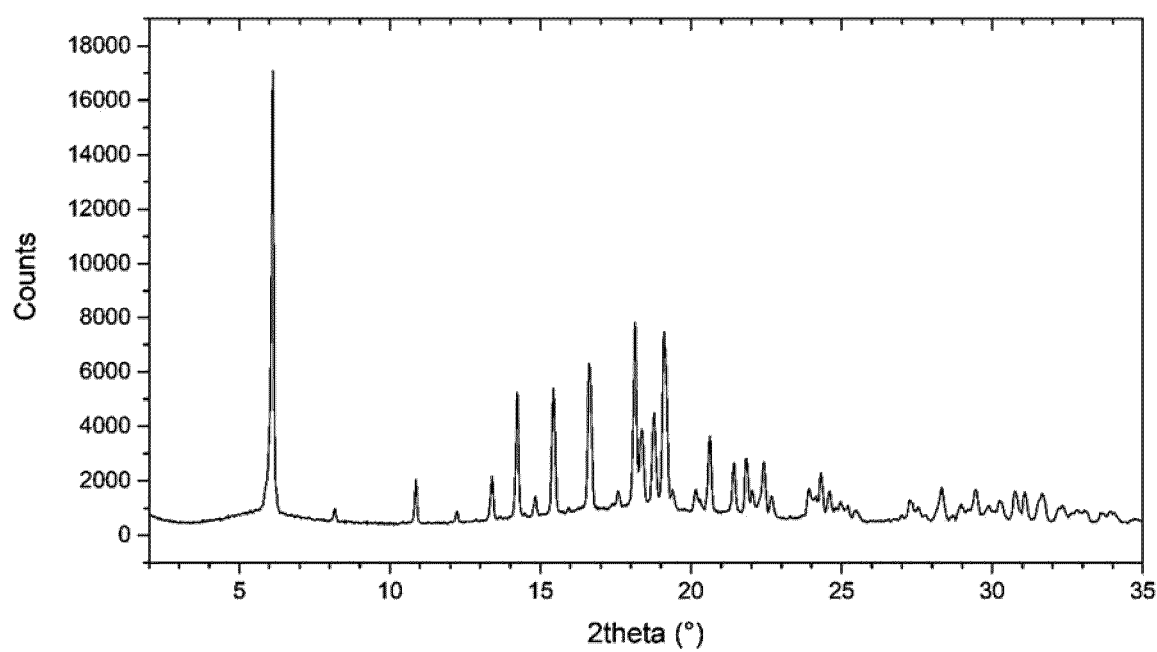
FIG. 1 depicts the X-Ray Powder Diffractogram (XRPD) of crystalline Form I of sodium salt of Bempedoic acid prepared according to Example 1.

The crystalline form I can be also characterized by XRPD pattern depicted in FIG. 1.

The solid Form I can be prepared by a process comprising:
a. Dissolving of compound of formula (1) in methanol;
b. Addition of a sodium base;
c. Isolating of the crystalline Form I.

The concentration of compound of formula (1) in the methanol can be between 0.05 g/ml and 0.5 g/ml, preferably it is between 0.1 g/ml and 0.3 g/ml. Compound of formula (1) is dissolved in the alcohol at a temperature between 10° C. and the reflux temperature of used alcohol, preferably at a temperature between 20° C. and 50° C.

Used sodium base can be selected from for example sodium hydroxide or sodium hydride, sodium methoxide. The sodium base can be used in a form of a solution in an alcohol, for example methanol or can be added as solid. The molar ratio between compound of formula (1) and the sodium base can be between 1:2 and 1:2.2. After addition of the base the mixture is stirred for between 5 and 60 minutes. The isolating step c. comprises removing the alcohol, for example by distilling off, and cooling the mixture. After distilling off the alcohol, the rest can be optionally left stand at a temperature between 10° C. and 30° C. for between 24 and 36 hours to provide a viscous gel. The gel was cooled to a temperature between −10° C. and −50° C., preferably between −20° C. and −30° C. and left at this temperature for between 3 to 24 hours, preferably for between 5 and 12 hours to obtain crystalline solid, Form I. Optionally the rest after alcohol removal can be cooled to a temperature between −10° C. and −50° C., preferably between −20° C. and −30° C. and left at this temperature for between 3 to 24 hours, preferably for between 5 and 12 hours to obtain crystalline solid, Form I.

The invention further relates to the crystalline form, Form II, that can be characterized by XRPD pattern having 2θ values 7.5°, 18.3° and 19.4° degrees 2 theta (±0.2 degrees 2 theta). The solid Form I can be also characterized by XRPD pattern having 2θ values 7.5°, 16.8°, 18.3° and 19.4° degrees 2 theta (±0.2 degrees 2 theta). The solid form can be further characterized by XRPD pattern described in the following table:

| Angle 2θ | Intensity % | Angle 2θ | Intensity % | Angle 2θ | Intensity % | Angle 2θ | Intensity % |
|---|---|---|---|---|---|---|---|
| 6.4 | 39.2 | 15.6 | 2.9 | 20.7 | 15.2 | 25.7 | 3.4 |
| 7.5 | 100.0 | 16.8 | 13.3 | 21.4 | 0.5 | 27.1 | 0.9 |
| 11.7 | 0.3 | 17.7 | 3.2 | 22.3 | 2.0 | 27.9 | 1.4 |
| 12.8 | 3.6 | 18.3 | 14.3 | 23.2 | 0.8 | 29.4 | 0.8 |
| 13.5 | 4.5 | 18.6 | 7.8 | 23.4 | 4.5 | 30.1 | 1.9 |
| 15.3 | 5.1 | 19.2 | 9.6 | 24.9 | 2.5 | 32.9 | 0.7 |
|  |  | 19.4 | 20.8 |  |  |  |  |

Figure 2:
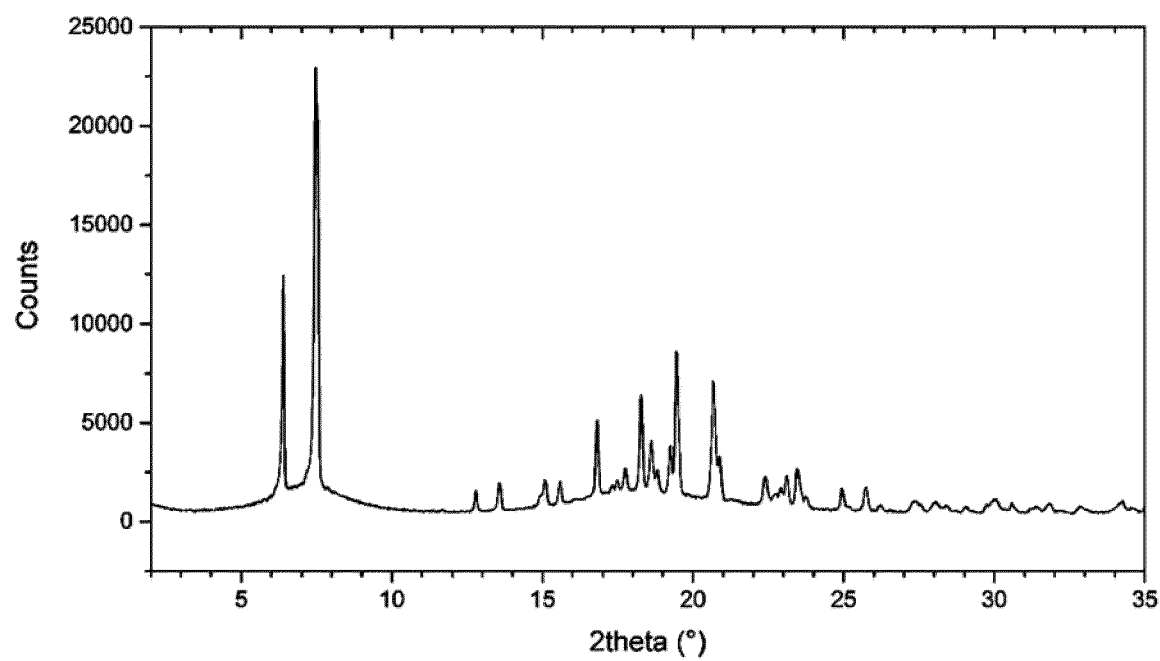
FIG. 2 depicts the X-Ray Powder Diffractogram (XRPD) of crystalline Form II of sodium salt of Bempedoic acid prepared according to Example 2 or 3.

The crystalline form II can be also characterized by XRPD pattern depicted in FIG. 2.

The solid Form II can be prepared by a process comprising drying crystalline Form I at a temperature between 30-70° C. for 6-24 hours.

The solid Form II can be also prepared by a process comprising:
   a. Dissolving compound of formula (1) in an alcohol;
   b. Addition of sodium base;
   c. Addition of an antisolvent;
   d. Isolation of a solid and treatment of obtained solid at 25-35° C. and 30-50% of relative humidity for 12-48 hours.

The alcohol in step a. can be selected from methanol or ethanol or propanol or isopropanol or butanol or isobutanol or pentanol or isopentanol or hexanol. The concentration of compound of formula (1) in alcohol can be between 0.05 g/ml and 0.5 g/ml, preferably it is between 0.1 g/ml and 0.3 g/ml.

Compound of formula (1) is dissolved in the alcohol at a temperature between 10° C. and the reflux temperature of used alcohol, preferably at a temperature between 20° C. and 50° C.

Used sodium base can be selected from for example sodium hydroxide or sodium alkoxide such as sodium methoxide or sodium ethoxide or sodium hydride. The sodium base can be used in a form of a solution in an alcohol or can be added as solid. The molar ratio between compound of formula (1) and the sodium base can be between 1:2 and 1:2.2. After addition of the base the mixture is stirred for between 5-60 minutes and to the mixture an antisolvent (i.e. liquid that do not dissolve sodium salt of bempedoic acid) is added. The antisolvent is selected from acetonitrile or an acetate such as ethyl acetate or methyl acetate or acetone or 2-butanone or an ether such as diethylether or diisopropylether or methyl-tert butyl ether. Preferably acetonitrile is used. The volume ratio between the alcohol and used antisolvent can be between 1:3 and 1:10, preferably between 1:5 and 1:8. The mixture is stirred for between 2 and 10 hours, preferably between 2.5 and 5 hours at a temperature between 25-50° C. The obtained solid (solid Form IV) can be isolated by any suitable technique, for example using filtration. The solid is treated at 25-35° C. and 30-50% of relative humidity for 12-48 hours to obtain solid non-sticky Form II of sodium salt of Bempedoic acid.

The solid form IV can be characterized by XRPD pattern having 2θ values 4.1°, 7.7°, 8.2° and 12.3° degrees 2 theta (±0.2 degrees 2 theta). The solid form can be further characterized by XRPD pattern described in the following table:

| Angle 2θ | Intensity % |
|---|---|
| 4.1 | 60.4 |
| 7.7 | 65.5 |
| 8.2 | 86.0 |
| 9.6 | 59.8 |
| 9.7 | 58.8 |
| 12.3 | 100.0 |
| 12.6 | 58.5 |
| 14.9 | 52.7 |
| 16.2 | 79.6 |
| 16.5 | 62.9 |
| 17.1 | 71.7 |
| 18.9 | 55.7 |
| 19.8 | 59.2 |
| 20.0 | 56.9 |
| 20.5 | 61.9 |
| 20.7 | 71.5 |
| 21.4 | 55.6 |
| 22.1 | 77.2 |
| 23.0 | 55.7 |
| 23.7 | 61.7 |
| 24.6 | 57.3 |
| 29.6 | 60.9 |
| 30.3 | 56.7 |

Figure 4:
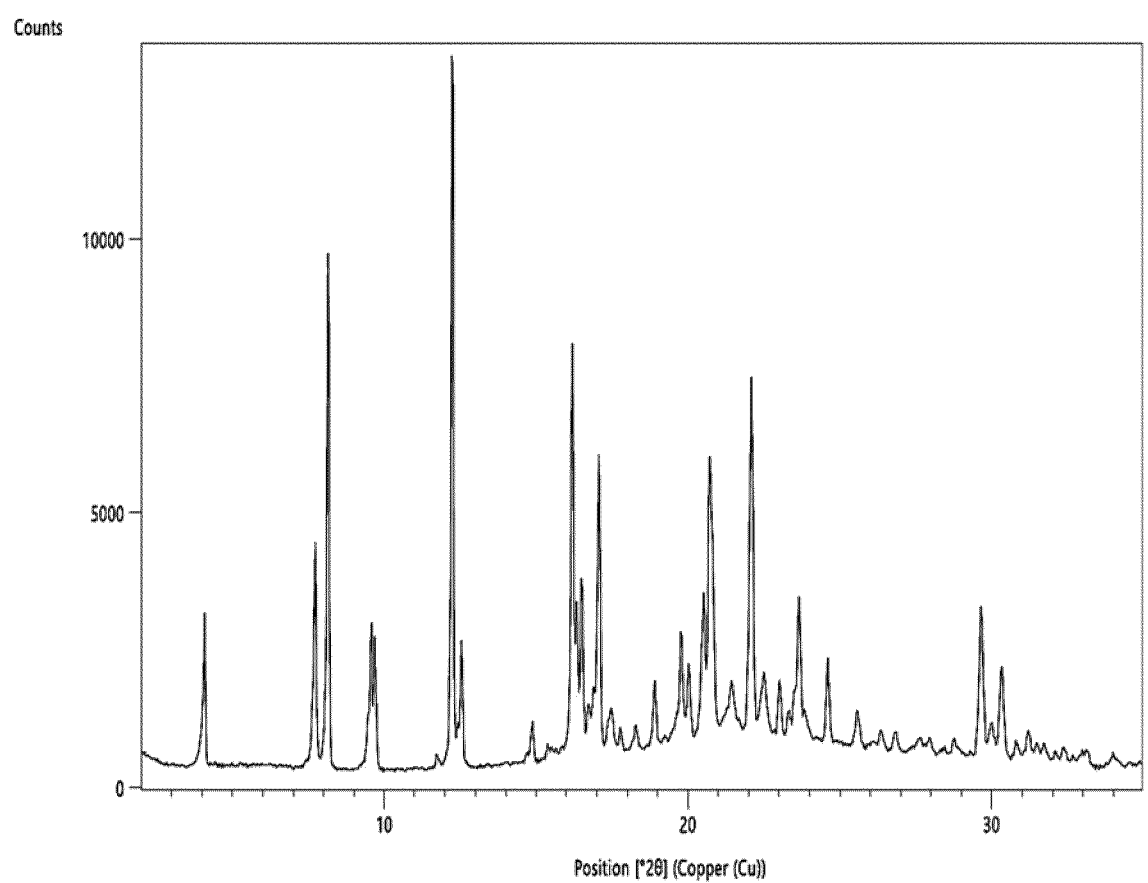
FIG. 4 depicts the X-Ray Powder Diffractogram (XRPD) of crystalline Form IV of sodium salt of Bempedoic acid prepared according to Example 3.
Figure 5:
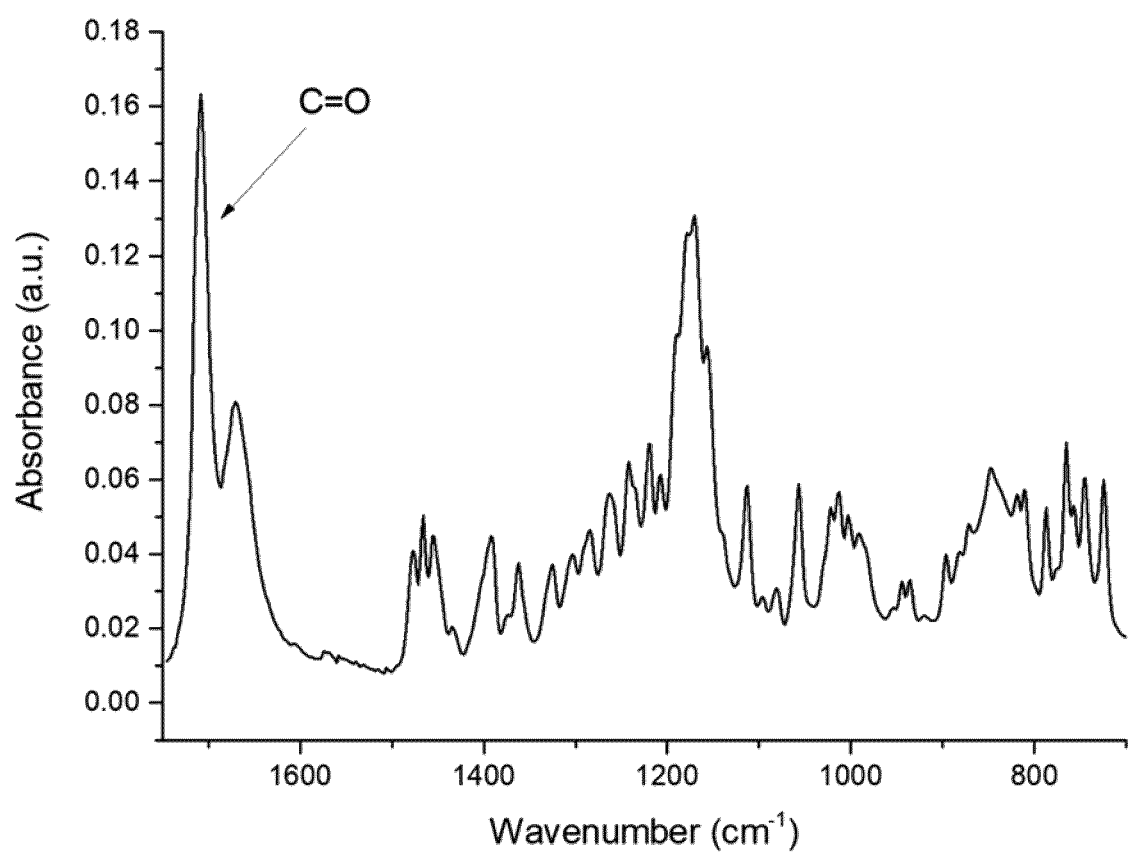
FIG. 5 depicts IR spectrum of Bempedoic acid.
Figure 6:
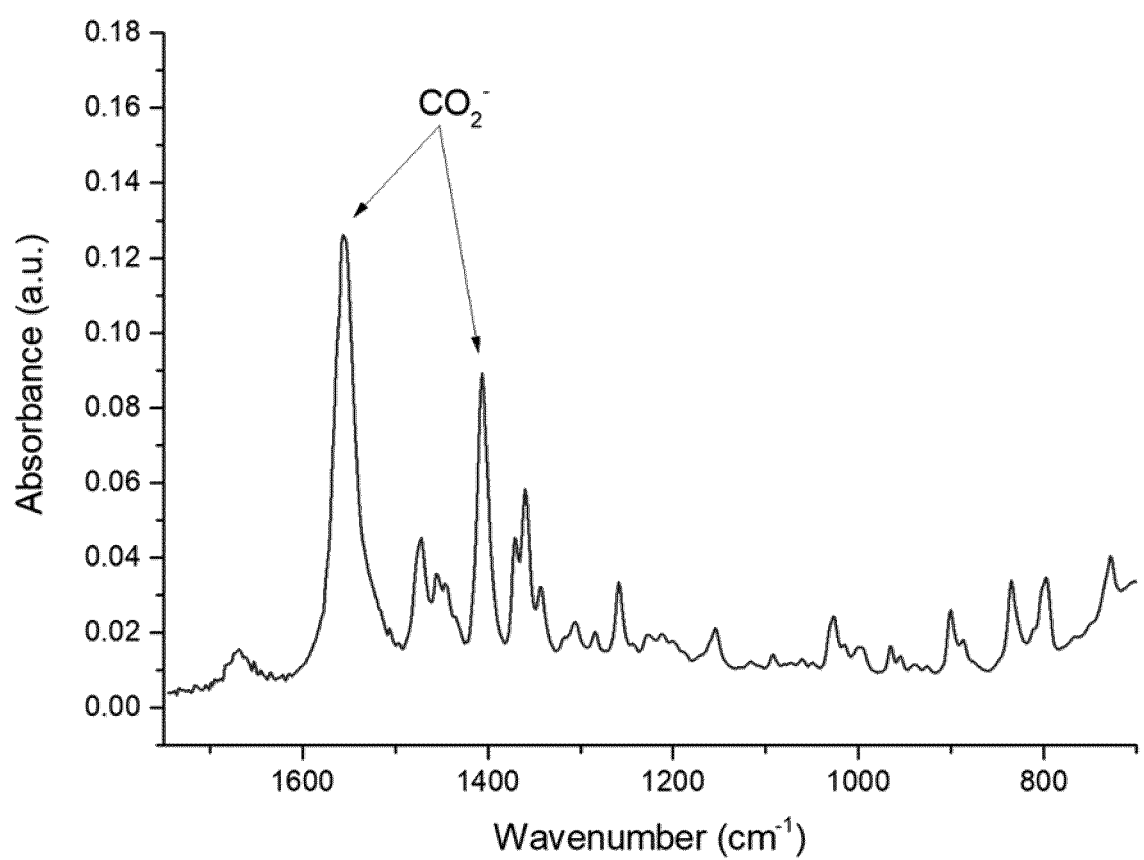
FIG. 6 depicts IR spectrum of sodium salt of Bempedoic acid prepared according to Examples 1 to 4.

The crystalline Form IV can be also characterized by XRPD pattern depicted in FIG. 4.

The invention also relates to a crystalline form of sodium salt of Bempedoic acid, Form III, that can be characterized by XRPD pattern having 2θ values 6.5°, 8.6° and 17.3° degrees 2 theta (±0.2 degrees 2 theta). The solid form can be further characterized by XRPD pattern described in the following table:

| Angle 2θ | Intensity % |
|---|---|
| 5.8 | 4.3 |
| 6.5 | 100.0 |
| 8.1 | 7.2 |
| 8.6 | 38.4 |
| 9.8 | 7.0 |
| 10.1 | 6.6 |
| 13.1 | 12.9 |
| 17.3 | 24.3 |

Figure 3:
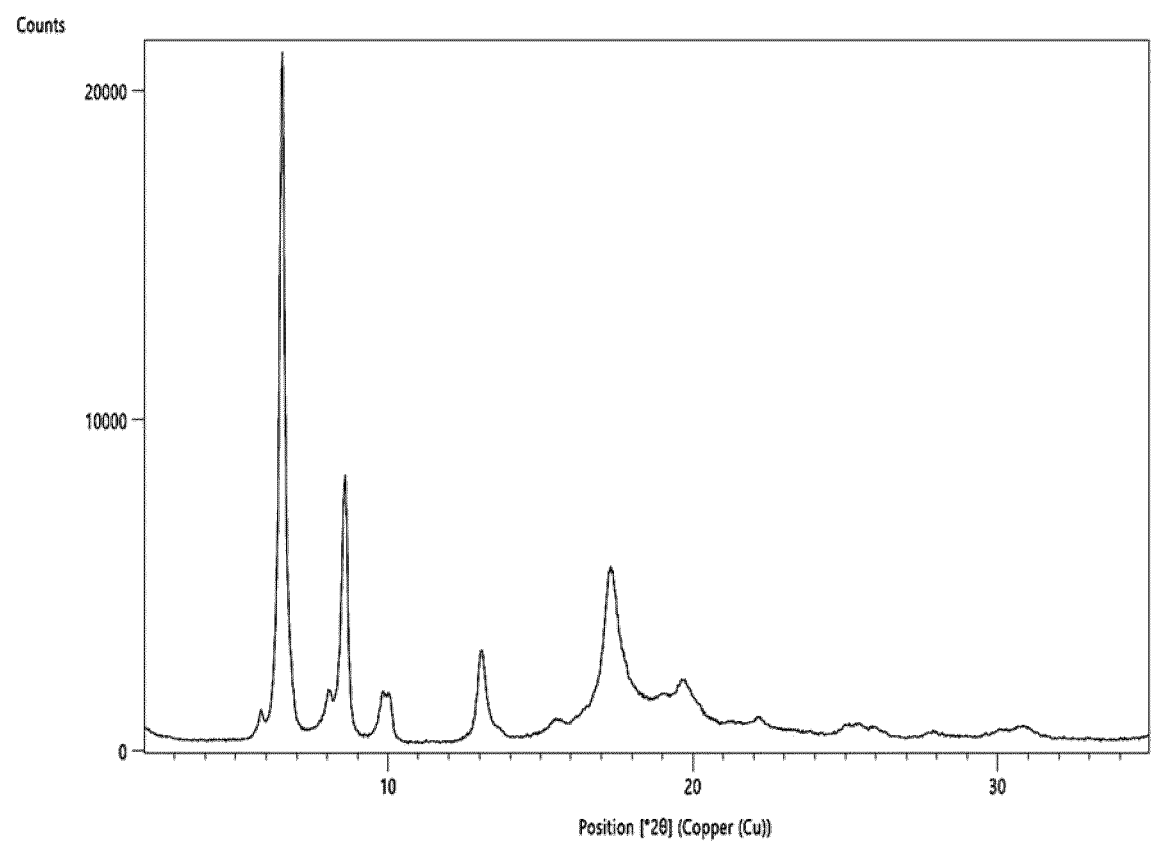
FIG. 3 depicts the X-Ray Powder Diffractogram (XRPD) of crystalline Form III of sodium salt of Bempedoic acid prepared according to Example 4.

The crystalline Form III can be also characterized by XRPD pattern depicted in FIG. 3.

The crystalline Form III can be prepared by a process comprising treating of crystalline form of sodium salt of Bempedoic acid, Form I or Form II at a temperature between 120° C. and 140° C., preferably at 130° C. under a protection atmosphere, for example under argon or nitrogen atmosphere.

Obtained crystalline Forms I or II or III or IV of sodium salt of Bempedoic acid shows good crystallinity and solubility and stability. Solid Forms I or II or III or IV of sodium salt of Bempedoic acid (compound of formula (1)) can be also used for purification of compound of formula (1). Solid sodium salt prepared by using a disclosed process can be transformed into compound of formula (1) using an acid in a suitable solvent, for example an alcohol.

The crystalline Forms I or II or III or IV of sodium salt of Bempedoic acid can be processed into a suitable pharmaceutical formulation. In the pharmaceutical formulation the solid forms can be mixed with pharmaceutically acceptable adjuvants, diluents or carriers. The amount of crystalline Form I or II or III or IV in the formulation depends on the condition and a patient to be treated. The pharmaceutical formulation can be if form of a solid oral formulation, for example a capsule, a pill, a powder or a granule. In the formulation the crystalline Form I or II or III according to presented invention can be mixed with one or more additives such as fillers or extenders or binders or wetting agents or disintegrating agents or absorbents or lubricants or buffering agents. The formulation in a form of a tablet or a dragee or a capsule or a pill or a granule can be coated with a coating or shell such as enteric or other coating. The oral formulation can be in a form of an oral emulsion or a solution or a suspension or a syrup. The formulation can contain suitable additives such as diluent(s) or wetting agent(s) or emulsifying agent(s) or suspending agent(s) or sweetening agent(s) or flavouring agent(s). The examples of suitable additive(s) are known to those skilled in the art.

The suitable pharmaceutical formulation can be in a parenteral form such as an injection or an infusion or an injectable depot or in a liposomal form comprising pharmaceutically acceptable aqueous or non-aqueous solution(s) or dispersion(s) or emulsions. The pharmaceutical formulation can be also in a form of a powder for reconstitution into an injection or infusion. The formulation can further comprise additives such as preservative(s) or wetting agent(s) or emulsifying agent(s) or dispersing agent(s) or antibacterial or antifungal agents. The examples of suitable additive(s) are known to those skilled in the art.

The suitable pharmaceutical formulation can be in a form suitable for rectal or vaginal administration further comprising suitable additive(s). The examples of suitable additive(s) are known to those skilled in the art.

The crystalline Forms I or II or III or IV or a pharmaceutical formulation comprising the form can be used for the treatment of conditions treatable with Bempedoic acid or a salt thereof.

The invention will be further described with reference to the following examples.

EXAMPLES

IR spectrum was obtained using following measurement conditions: FT-IR spectrometer Nicolet 6700 using ATR (Si crystal) method. The background was analyzed before measurement and subsequently the sample was directly placed and pressed to the crystal and measurement was performed. The final result is difference between spectrum of material and background without sample.

XRPD spectrum was obtained using the following measurement conditions:

Panalytical Empyrean diffractometer with Θ/2Θ geometry (transmition mode), equipped with a PixCell 3D detector;

| | |
|---|---|
| Start angle (2Θ): | 2.0° |
| End angle (2Θ): | 35.0° |
| Step size: | 0.026° |
| Scan speed: | 0.0955°/seconds |
| Radiation type: | Cu |
| Radiation wavelengths: | 1.5406 Å (Kα1), primary monochromator used |
| Divergence slit: | 1/2° |
| Antiscatter slit: | 1/2° |
| Soller slit: | 0.02 rad |
| Detector slit: | 7.5 mm |
| Rotation speed: | 30 rpm |

Example 1: Preparation of Crystalline Form I of Sodium Salt of Bempedoic Acid

Bempedoic acid was prepared according to a process disclosed in WO 2004067489 application.

100 mg of Bempedoic acid was dissolved in 0.5 ml of methanol. To the mixture a solution of 23.5 mg of sodium hydroxide in 0.5 ml of methanol was added at once into the solution of bempedoic acid under constant stirring. The solvent was then evaporated. A viscous gel was obtained after approximately 48 hours. After freezing for 3 to 12 hours at −25° C., colourless, crystalline solid is obtained in quantitative yield.

XRPD pattern of obtained solid corresponds to a pattern depicted in FIG. 1.

Example 2: Preparation of Crystalline Form II of Sodium Salt of Bempedoic Acid 80 mg of sodium salt of Bempedoic acid, Form I, prepared according to Example 1 was dried in vacuum at 60° C. for 3-5 hours to obtain Form II of sodium salt of Bempedoic acid in quantitative yield.

XRPD pattern of obtained solid corresponds to a pattern depicted in FIG. 2.

Example 3: Preparation of Crystalline Form II of Sodium Salt of Bempedoic Acid

Bempedoic acid was prepared according to a process disclosed in WO 2004067489 application.

100 mg of Bempedoic acid was dissolved in 0.5 ml of methanol. To the mixture a solution of 23.5 mg of sodium hydroxide in 0.5 ml of methanol was added at once into the solution of bempedoic acid under constant stirring. To the solution 3.5 ml of acetonitrile was added dropwise, the mixture was stirred at 25° C. for 3 hours. The suspension was filtrated to obtain a solid (Form IV, XRPD pattern of obtained solid corresponds to a pattern depicted in FIG. 4). The solid transforms into Form II at 25° C. and 40-45% humidity in 12 hours in a yield 78%.

XRPD pattern of obtained solid corresponds to a pattern depicted in FIG. 2.

Example 4: Preparation of Crystalline Form III of Sodium Salt of Bempedoic Acid

A crystalline form of sodium salt of Bempedoic acid, Form I, is left at a temperature 130° C. under nitrogen atmosphere for 8 hours. Form III is obtained in quantitive yield.

The procedure was repeated with sodium salt of Bempedoic acid, Form II.

A crystalline form of sodium salt of Bempedoic acid, Form II, is left at a temperature 130° C. under nitrogen atmosphere for 8 hours. Form III is obtained in quantitive yield.

XRPD pattern of obtained solid corresponds to a pattern depicted in FIG. 3.

The invention claimed is:

1. A crystalline form of a sodium salt of Bempedoic acid, compound of formula (2):

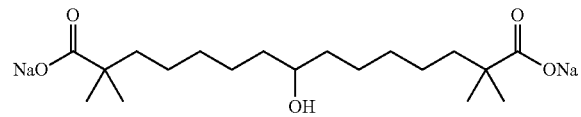

(2)

wherein said crystalline form is Form I, characterized by XRPD pattern having 2θ values 6.1°, 14.2° and 16.6° degrees 2 theta ±0.2 degrees 2 theta.

2. The crystalline form according to claim 1 characterized by XRPD pattern having 2θ values 6.1°, 13.4°, 14.2°, 15.4° and 16.6° degrees 2 theta ±0.2 degrees 2 theta.

3. The crystalline form according to claim 2 characterized by XRPD pattern depicted in FIG. 1.

4. A process for preparation of the crystalline form according to claim 1 comprising:
a) dissolving compound of formula (1) in methanol

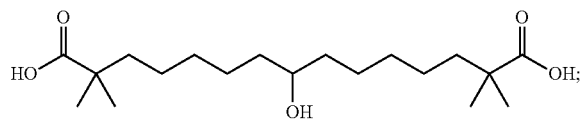

(1)

b) adding a sodium base;
c) isolating the crystalline Form I.

5. The process according to claim 4 wherein the sodium base is selected from the group consisting of sodium hydroxide, sodium hydride, and sodium methoxide.

6. The process according to claim 5 wherein the base is sodium hydroxide.

7. The process according to claim 4 wherein the isolating step c) comprises removing the alcohol and cooling the rest to a temperature between −10° C. and −50° C.

8. The process according to claim 7 wherein the rest is cooled to a temperature between −20° C. and −30° C.

9. A crystalline form of a sodium salt of Bempedoic acid, compound of formula (2);

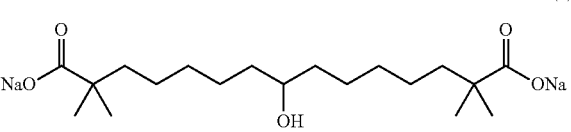

(2)

wherein said crystalline form is Form III, characterized by XRPD pattern having 2θ values 6.5°, 8.6° and 17.3° degrees 2 theta ±0.2 degrees 2 theta.

10. The crystalline form according to claim 9 characterized by XRPD pattern depicted in FIG. 3.

11. A process for preparation of the crystalline form according to claim 9 comprising treating of crystalline form of sodium salt of Bempedoic acid, Form I or Form II at a temperature between 120° C. and 140° C.

* * * * *